July 10, 1956 — D. JACOBSON — 2,754,400

SPACE HEATER

Filed Feb. 11, 1953 — 2 Sheets-Sheet 1

July 10, 1956  D. JACOBSON  2,754,400
SPACE HEATER

Filed Feb. 11, 1953  2 Sheets-Sheet 2

2,754,400

SPACE HEATER

David Jacobson, Crumpsall, Manchester, England

Application February 11, 1953, Serial No. 336,405

5 Claims. (Cl. 219—34)

This invention relates to space heaters, and is more particularly concerned with space heaters provided with electrical heating means.

According to the invention, there is provided in or for a space heater, a casing having at least one part comprising a series of compartments disposed around, and opening outwardly from, a central axis, said compartments being constituted by walls extending in a direction from end to end of the casing along lines substantially parallel to the axis, and each compartment including at least one reflecting surface adapted, when at least one source of heat is provided at, or in the region of, said axis, to reflect radiated heat outwardly of the casing.

For a better understanding of the invention and to show how it may be carried into effect, an embodiment thereof will now be described, by way of example, with reference to the accompanying drawings, in which.

Figure 1:
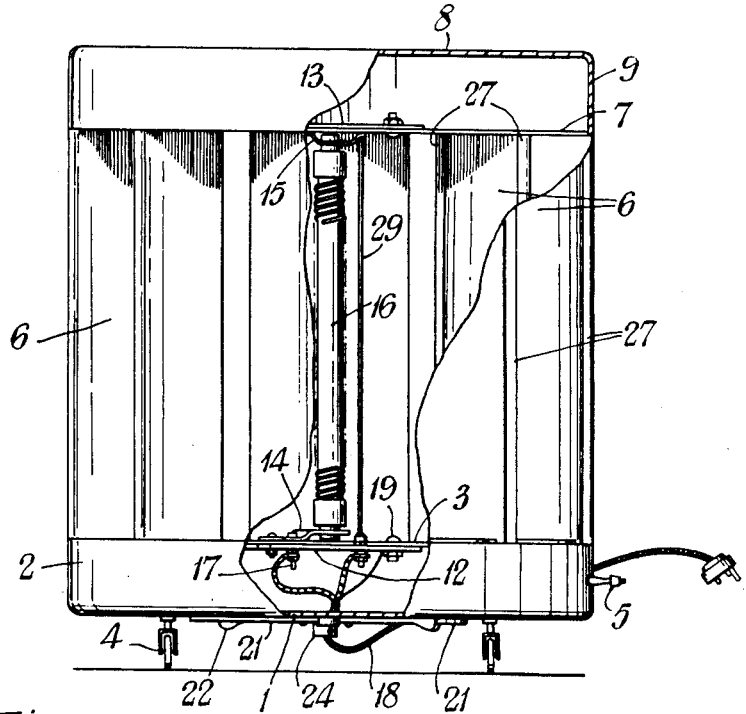
Figure 1 is a side elevation, partly broken away, of an electric space heater according to the invention.

The electric heater shown in the drawings, comprises a casing having a circular base part 1 formed with a peripheral flange 2, to which flange there is connected a circular support plate 3. The plate 3 is preferably arranged so that its upper face is flush with the upper edge of the flange 2. The base part is mounted upon castors 4 and is provided with a handle 5.

The plate 3 supports a plurality (in the present example—eight) upright division walls 6 which, in horizontal section, are of curved contour. The walls are connected at their upper ends to an upper support plate 7 and, above the plate 6, there is mounted a circular cover part 8. The latter has a depending peripheral flange 9, and the lower edge of the flange 9 is preferably flush with the lower face of the plate 7. In the present example the support plates 3 and 7 define a casing which is substantially cylindrical in form, but it will be understood that the casing may be rectangular or of any other configuration.

Figure 2:
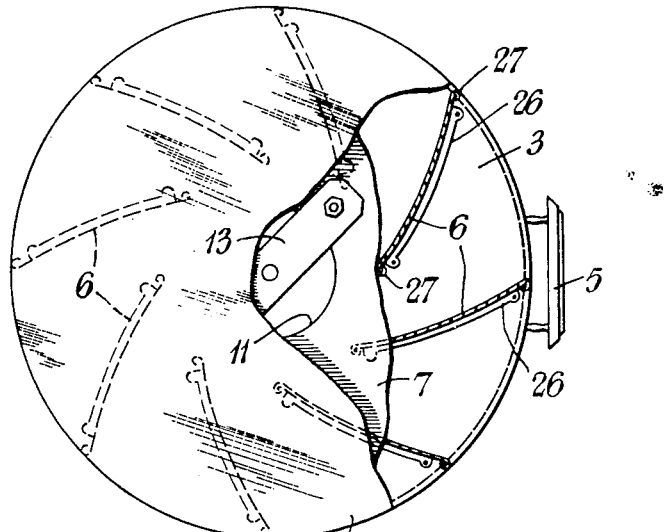
Figure 2 is a plan view according to Figure 1.

As shown in Figure 2, the walls 6 are arranged around the central axis of the casing, so as to divide the casing into a series of compartments, the upper and lower ends of which compartments are closed by the support plates, and the radially inner and outer sides of which are open.

The support plates 3 and 7 are similar in shape, each being formed with a central circular opening, as shown at 10 and 11, respectively. The support plates each have secured thereto, as by screw means, an insulating block 12, 13 formed of porcelain, or other electrical insulating material such as asbestos. The blocks 12 and 13 carry metal brackets 14 and 15 which support an electric heating element 16 of tubular form, the element being disposed with its axis substantially coincident with the axis of the casing. The lower insulating block 12 carries terminals 17 to which are connected the ends of an electricity supply cable 18. A conductor 29 extends from one of the terminals 17 to the upper bracket 15 to complete the heating element circuit. A terminal is provided at 19 for the connection of an earth wire to the casing.

Figure 3:
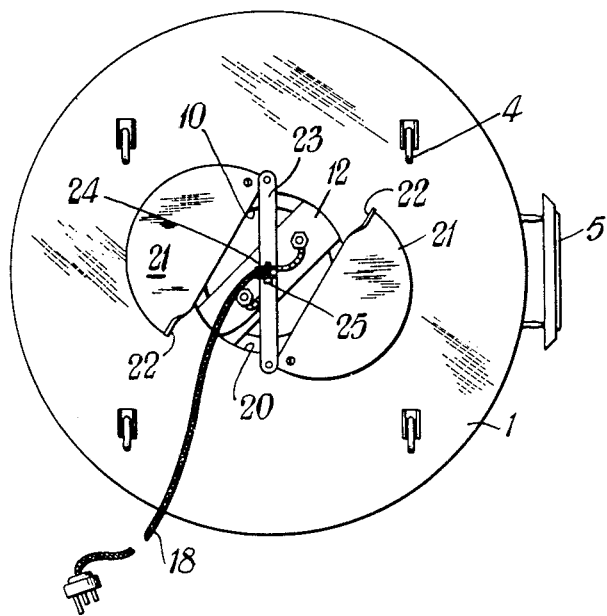
Figure 3 is an underneath plan view according to Figure 1.

The base part 1 is formed at its centre with a circular air-inlet aperture 20 of somewhat larger diameter than the aperture 10 in the support plate 3. A pair of adjustable shutters 21 (see Figure 3) are pivotally connected to the underside of the base part 1, so as to provide for regulation in the supply of air from below the base part into the interior of the casing. The shutters are provided with depending lugs 22 to facilitate the opening and closing of the shutters. If desired, however, the shutters may be adjusted in position by lever, or other means, operatively connected to the shutters and adapted to be manipulated from above the support plate 3, or from the exterior of the casing.

A metal strip 23 secured to the underside of the base part 1, and arranged to extend diametrically across the aperture 20, is provided at its centre with a depending clamp 24. The clamp is substantially U-shaped in section and so arranged that the cable 18 can pass therethrough and can be secured by the tightening of a clamping screw 25.

The upright edges of the walls 6 are reinforced by rolled beads 27, and the walls are secured to the support plates by brackets 26 (see Figure 2). The curved surfaces of the walls 6, and the upper and lower faces respectively of the support plates 3 and 7, are plated, or polished, to provide high reflecting surfaces.

The walls 6 thus constitute reflectors and their curvature is such that, in horizontal section, they are each substantially in the form of a part of a parabola. As shown in Figure 2, the inclination of the walls is also such that their outer vertical edges are positioned at the periphery of the casing, while their inner vertical edges are disposed in a circle about the centre of the casing, to define a central cylindrical space or chamber which is of larger diameter than the apertures 10 and 11. More particularly, the disposition of the reflecting walls 6 is such that the focal line of each parabolic surface is substantially coincident with the axis of the casing, and the arrangement and circumferential spacing of the walls are such that the heating element 16 is visible between the inner vertical edge of one wall and the outer vertical edge of an adjacent wall.

Thus, when the cable 18 is connected to a source of electricity, heat radiated from the element 16 will be reflected outwardly by the concave reflecting faces of the walls 6, and direct radiation will also occur since certain of the rays from the element will pass between adjacent walls of each compartment, directly to the exterior of the casing. Due to the parabolic form of the reflectors and the location of the heating element, at or near to, the focal point of the curved reflecting surfaces, the rays reflected by each of the latter surfaces will be substantially parallel to each other. Moreover, the disposition of the walls 6 is such that the radiation reflected by the concave reflecting surface of one wall will not impinge upon the convex surface of the next adjacent wall.

Heating of the air at the centre of the casing will give rise to convection currents, a current of air being allowed to flow into the casing through the apertures 10 and 20. Some of the heated air will pass through the aperture 11 into the upper chamber formed by the cover part 8. The top of the casing will thus be warmed and may be used as a warming plate. The remaining air heated within the casing will escape through the compartments to warm the surrounding atmosphere by convection.

The flow of air through the bottom of the casing may be controlled by the opening or closing of the shutters 21.

It will be appreciated that the air space provided by the upper chamber, and the regulation in the supply of air through the bottom of the casing, enables the heating of the casing top to be controlled, within limits, so as to prevent the upper part of the casing becoming too hot, or causing a burn if accidentally touched.

The heater may be placed in the middle of a room, or beneath a table, so that a number of people can sit around the heater. The castors permit the heater readily to be moved about either by means of the handle 5, or by the pulling of the cable 18. Since the cable is secured to the clamp 24 disposed on the axis, and below the centre of gravity, of the casing, the heater will not overturn when the cable is pulled either intentionally or accidentally.

The casing may conveniently be formed of sheet metal and the various parts secured together, as by welding. If desired, however, other materials such as glass or synthetic plastic substances, may be employed in the manufacture of the casing.

Figures 4, 5:
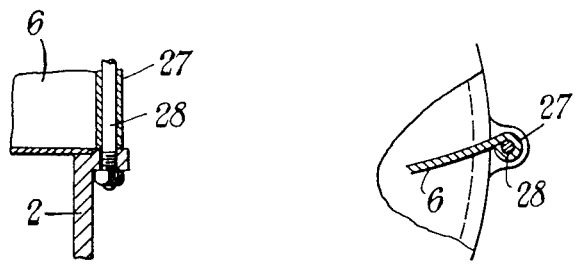
Figure 4 is a sectional detail view illustrating a constructional modification.
Figure 5 is a partial plan view according to Figure 4.

Figures 4 and 5 show an alternative method for securing the partition walls in position. In this arrangement, the bead 27 along each vertical edge of each partition wall, is adapted to receive a rod 28, the opposite ends of the rod being threaded to receive a nut, so that the rod may be secured to the lower and upper parts of the casing. As shown in Figures 4 and 5, the lower end of the rod at the radially outer edge of each wall may engage in a lug provided on the flanged periphery of the base part, and the opposite end of the rod may be secured to the upper part of the casing in a similar manner. The rods at the radially inner edges of the walls may engage in threaded nut means secured to the upper and lower support plates. If desired, the walls may be arranged for pivotal motion about the rods 28 which pass through the beads 27 at the outer edges of the walls, thereby to provide for angular adjustment of the walls in a plane substantially normal to the axis of the casing. In such an arrangement the walls may be secured in adjusted position, as by tightening of the nuts at the opposite ends of the rods 28.

It will be understood that a casing, or guard, which incorporates, for example, the upper and lower support plates and the partition walls therebetween, may be arranged for removable connection to a base part, which latter carries, or is adapted to carry, the tubular heating element.

The heater may comprise two or more heating elements arranged one above another and located on the axis of the casing. If desired several elements may be mounted around the axis of the casing. Moreover each compartment may be formed by a pair of reflectors which face each other. For instance, a heater may comprise four compartments disposed symmetrically around the axis of the casing, each compartment being constituted by, for example, two parabolic reflectors which face each other and which are so arranged that their focal lines are coincident with the axis of the casing along which axis the heating element, or elements, is or are mounted.

Moreover, a heater may consist of two or more sections, disposed one upon another, each section either comprising a single heating element and several curved reflectors, as described with reference to the accompanying drawings, or alternatively, each section may have two or more elements in the manner indicated above.

Where more than one heating element, or section, is provided, it will be advantageous to incorporate switch means, so that any element, or section, not required may be switched out of circuit.

The top of the heater may be formed with one or more openings, and each of the openings may be provided with a grill and/or with removable cover means.

The top of the heater may also be provided with means for the attachment of a table top adapted to serve, for instance, as a coffee table. The attachment means could incorporate a bearing to permit the table top to be rotated.

In order that the heater may be placed in a corner of a room, or near to other furniture, there is provided a curved plate, polished on its inner face, and adapted to be clipped, or otherwise removably secured to the casing, so as to act as a shield on one side or part of the heater.

I claim:

1. For a space heater, a casing comprising spaced end members, reflecting walls concave in transverse section and extending between said end members and disposed substantially perpendicularly thereto, means for maintaining adjacent walls in spaced apart and divergent relation to provide a series of compartments closed at opposite ends by said end members and arranged around and opening outwardly from an axis of the casing, said compartments having open inner and outer sides defined by the inner and outer edges respectively of the spaced reflecting walls, and said casing including an inner central chamber bounded by the inner edges of said reflecting walls, means for supporting within said central chamber a source of heat in a position substantially coincident with a focal line common to all of said concave reflecting walls, with said source of heat visible through the open outer sides of all of said compartments for direct radiation of heat between the reflecting walls of the compartments from said source to the exterior of the casing, the concave reflecting wall in each compartment being located outwardly and in front of said supporting means for reflecting radiated heat outwardly of the casing through the outer open side of the compartment.

2. For a space heater, a casing comprising spaced end members, reflecting walls substantially parabolic in transverse section and extending between and disposed substantially perpendicularly with respect to said end members, means for fixedly securing said reflecting walls to said end members and for maintaining the adjacent walls in spaced apart and divergent relation to provide a series of compartments closed at opposite ends by said end members and arranged relatively fixedly around and opening outwardly from an axis of the casing, each two adjacent reflecting walls having their inner longitudinal edges spaced apart to define an open inner side of the associated compartment, and the outer longitudinal edges of said adjacent walls being spaced apart to a greater extent than the inner longitudinal edges to define an open outer side of the compartment angularly removed in offset relation to said open inner side, means located inwardly and to the rear of the inner open sides of the compartments for supporting a tubular heating element in a position substantially coincident with a focal line common to all of said parabolic reflecting walls and with the heating element visible through the open outer sides of all of said compartments so that heat radiated by said heating element can pass directly through the compartments to the exterior of the casing, and said parabolic reflecting walls being located outwardly and in front of said supporting means for the reflection of radiated heat outwardly from the casing through the outer open sides of the compartments.

3. A space heater comprising a casing having end members, a plurality of reflecting walls concave in transverse section and extending between and secured at their opposite ends to said end members, said reflecting walls being disposed in divergent relation and defining a series of compartments extending around and opening outwardly from the casing, said compartments having open inner and outer sides defined by the inner and outer longitudinal edges respectively of said reflecting walls, said inner open sides defining within the casing a central chamber, a tubular heating element mounted within said central chamber and substantially coincident with a focal line common to all of the concave reflecting walls, said heating element being visible through the open outer sides of all of said compartments for the passage of radiated heat directly through said compartments from said element to the exterior of the casing, said concave reflecting walls being disposed in front of the heating element for reflecting radiated heat from said heating element outwardly of the casing through the outer open sides of the compartments.

4. A space heater comprising a casing having a hollow base part, a hollow cover part disposed above and co-axial with said base part, a plurality of upright reflectors substantially parabolic in transverse section and extending between and secured at their opposite ends to said base and cover parts, said reflectors being disposed in divergent relation and defining a series of compartments extending around and opening outwardly from an axis of said casing, open inner and outer sides for said compartments defined by the inner and outer longitudinal edges respectively of said reflectors, said inner open sides bounding within the casing a central upright chamber, at least one upright electrical heating element mounted within said central chamber and substantially coincident with a focal line common to all of the parabolic reflectors, said heating element being visible through the open outer sides of all of said compartments, for the passage of radiated heat directly through said compartments from said heating element to the exterior of the casing, said reflectors being disposed in front of the heating element for reflecting radiated heat outwardly of the casing through the outer open sides of the compartment.

5. A space heater as claimed in claim 4, wherein said hollow base part and said hollow cover part each have a bottom wall formed with a central air inlet aperture, shutter means adjustably mounted on the bottom wall of the base part for limiting the passage of air into the interior of the casing and controlling the flow of heated air into the cover part, supporting castors mounted on the bottom wall of said base part, and clamp means located substantially at the centre of said base part for securing an electric supply cable to the heater casing.

References Cited in the file of this patent

UNITED STATES PATENTS

| | | |
|---|---|---|
| 1,393,368 | Henry | Oct. 11, 1921 |
| 1,399,688 | Carmean | Dec. 6, 1921 |
| 1,554,675 | Horsey | Sept. 22, 1925 |
| 2,025,898 | Rhodes | Dec. 31, 1935 |

FOREIGN PATENTS

| | | |
|---|---|---|
| 368,784 | Great Britain | Mar. 10, 1932 |
| 536,820 | Great Britain | May 28, 1944 |
| 556,255 | Great Britain | Sept. 27, 1943 |
| 414,468 | Italy | July 30, 1946 |